Jan. 23, 1962   G. H. KINS   3,017,667
INJECTION MOLDING APPARATUS
Filed June 23, 1958   4 Sheets-Sheet 1

INVENTOR:
GEORGE H. KINS
By
Kurt Kelman

Jan. 23, 1962  G. H. KINS  3,017,667
INJECTION MOLDING APPARATUS
Filed June 23, 1958  4 Sheets-Sheet 3

INVENTOR:
GEORGE H. KINS
By
Kurt Kelman
AGENT

Jan. 23, 1962  G. H. KINS  3,017,667
INJECTION MOLDING APPARATUS
Filed June 23, 1958  4 Sheets-Sheet 4

INVENTOR:
GEORGE H. KINS
By
Kurt Kelman
AGENT

United States Patent Office 3,017,667
Patented Jan. 23, 1962

3,017,667
INJECTION MOLDING APPARATUS
Georg Heinrich Kins, 119 Hauptstrasse,
Hainstadt (Main), Germany
Filed June 23, 1958, Ser. No. 743,785
Claims priority, application Germany June 25, 1957
6 Claims. (Cl. 18—42)

The present invention relates to injection molding apparatus in general, and more particularly to improvements in means for introducing a molding compound into, for distributing the compound in, and for removing the molded product from, the mold space of such apparatus.

It is known in injection molding of relatively flat synthetic products to utilize a distributor which has one side connected to the supply orifice for a liquid molding compound and another side connected with narrow channels leading into the interior of a mold. Such distributors usually embody suitable heating devices which maintain the molding compound in plasticized state, the disadvantage of known distributors being in that they can be utilized only in connection with forms for injection molding of relatively flat products, i.e. in such forms in which the distance between the distributor and the molding surface or engraving of a mold is relatively small, which enables the molding compound to enter the mold space in a plastic state.

However, in manufacture of relatively bulky plastic products, such as various types of receptacles and containers, especially bath tubs, the distributors of known construction cannot be utilized because of excessive length of the supply conduits leading from the distributor to the interior of a relatively deep mold, especially in the arcuate zones of the mold space adjacent to the ends of a receptacle to be molded therein. It is practically impossible to maintain the plastic state of conveyed material in such relatively long supply conduits, and it is equally impossible to heat such conduits if the molds of known construction are utilized. The above drawbacks and deficiencies of injection molding apparatus constitute some of the grounds that relatively large and deep plastic containers, such as bath tubs, vans, parts of automobile chassis, and certain other bulky products are not manufactured on commercial basis by the injection molding process.

An important object of the present invention is to provide an apparatus which facilitates injection molding of relatively large and deep receptacles, containers and other bulky products by the injection molding process without risking that the molding compound would harden before reaching the mold space in the apparatus.

An additional object of the invention is to provide a distributor system for plastic molding compounds in injection molding apparatus which is adapted to convey the compound into immediate proximity of the mold space regardless of the shape of the plastic article molded in the apparatus.

Another object of the invention is to provide an injection molding apparatus in which the distributor system for the molding compound is so constructed that it forms part of the ejector mechanism for the molded product.

A further object of the invention is to provide an improved distributor system for molding compounds in injection molding apparatus which is relatively simple, cheap in manufacture, and which may be installed in injection molding apparatus of known construction.

A still further object of the invention is to provide a distributor system for plasticized molding compounds which is particularly suitable for injection molding of relatively large and deep plastic products, especially bath tubs, parts of automobile chassis and other bulky objects.

A concomitant object of the instant invention is to provide a distributor system for injection molding apparatus which requires little or no heating of the plastic compound as the latter is conveyed into the engraving of the mold.

A yet further object of the invention is to provide a distributor system for plastic molding compounds which is so constructed that the compound is subjected to little cooling as it is conveyed into the mold.

A still further object of the invention is to provide an injection molding apparatus which does not require supply channels between the plastic distributor and the mold space.

The above and many other objects of the invention are attained by the provision of a female die or mold, forming part of an injection molding machine, which is formed with one or more grooves in its molding surface for reception of inserts or blocks so constructed that they form relatively large channels which communicate with the source of plastic molding compound, the channel or channels being formed with a continuous slot or with a plurality of inlet orifices opening into the mold space to permit entry of material therein. The inserts are preferably coupled with suitable plunger means and are of such shape that the plungers or pistons may eject same from their groove in the molding surface together with the finished product. The inserts are usually disposed in pairs and may be moved apart to an extent sufficient to permit removal of hardened molding compound from the channel which they define. Depending on the dimensions of the mold, one, two, or more grooves may be provided therein, the grooves being so disposed that they lead the plastic material to, or into the proximity of, each zone of the mold space. To this end, the grooves may be parallel or may cross each other, and each groove receives one but preferably several pairs of inserts which latter may be so arranged that they retain each other by wedge action or in any other suitable way while the material distributing and molding steps take place. The grooves in the molding surface of female die are preferably bounded by a pair of inclined walls diverging in the direction toward the molding surface, and thus by their own configuration contribute to retention of the inserts therein. In other words, each groove may be of substantially trapezoidal cross section and diverges outwardly toward the mold space.

The diameter of channel or channels defined by the inserts is so selected that the conveyed material is subjected to relatively little cooling, and that it may be rapidly conveyed to all zones of the mold space between the molding surfaces of male and female dies.

Many other features, advantages and attributes of my improved injection molding apparatus will become apparent in the course of the following detailed description of certain embodiments selected for illustration in the accompanying drawings, in which:

FIG. 2a is a section taken on line IIa—IIa of FIG. 2 as seen in the direction of arrows;

Figure 2:
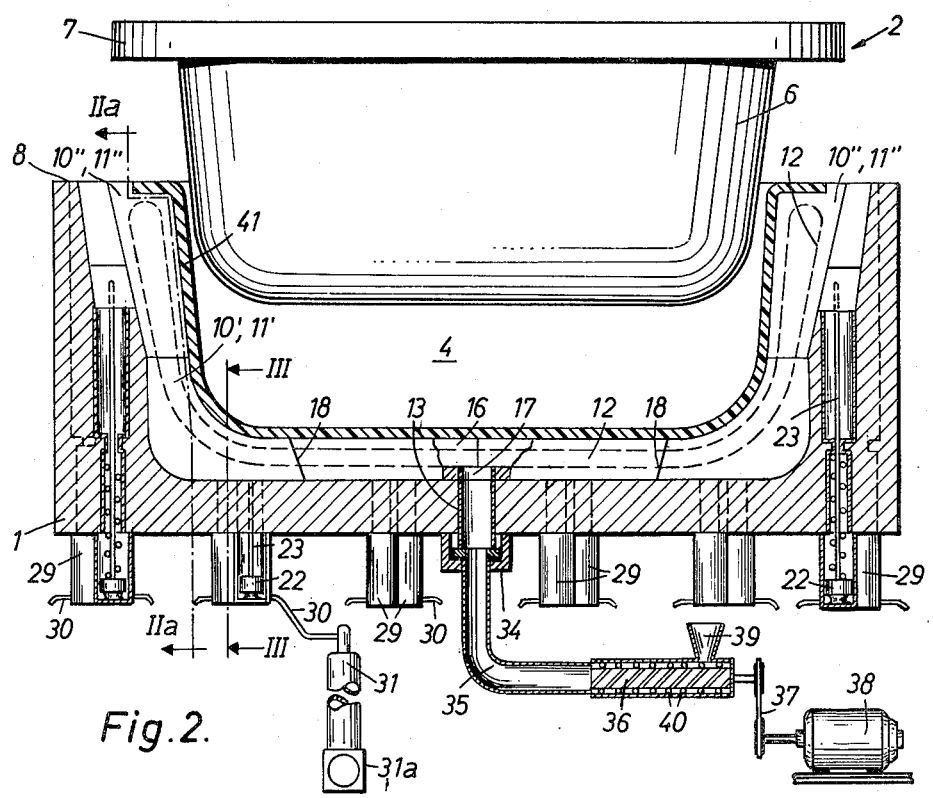
FIG. 2 is a longitudinal vertical section through the mold shown in FIG. 1, further illustrating the ram in lifted position, the source of plastic material, the finished product in section, and the ejector mechanism therefor.
Figure 4:
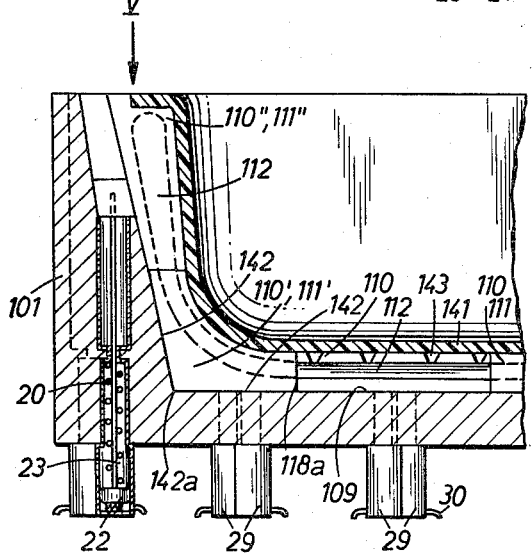
FIG. 4 is a fragmentary section similar to that of FIG.
Figure 5:
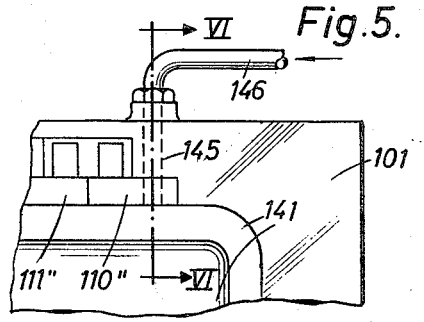
Figure 6:
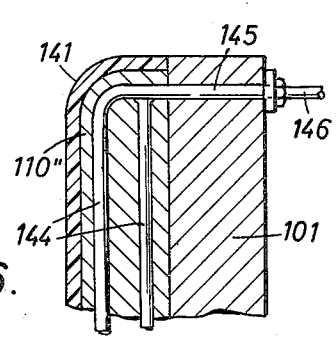
Figure 7:
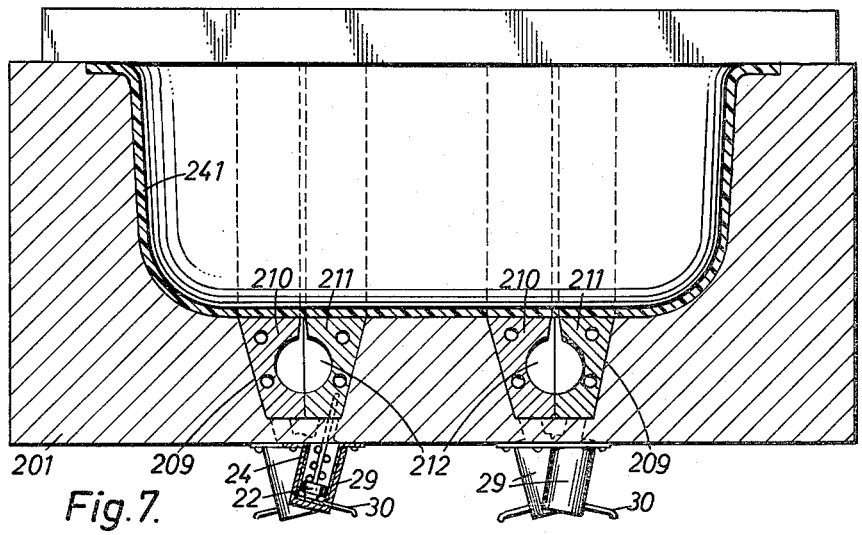
Figure 8:
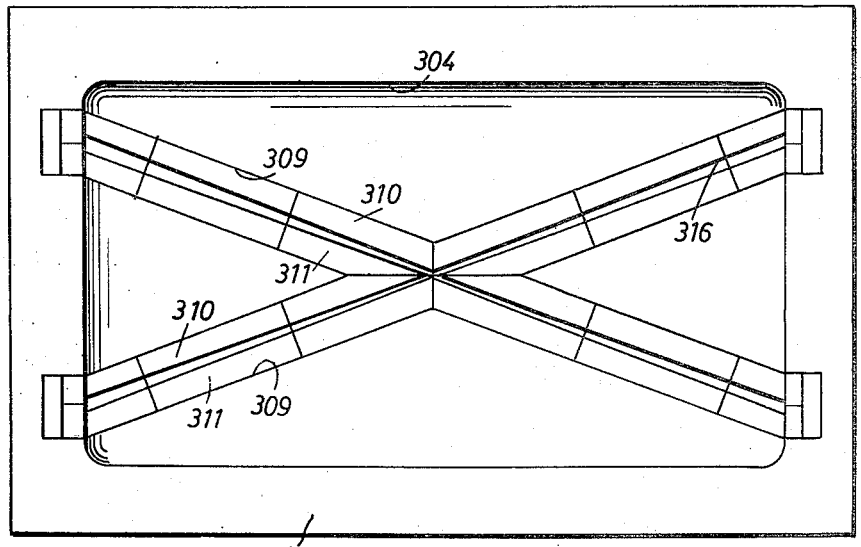

2, illustrating a slight modification of the distributor system;

FIG. 5 is a fragmentary elevational view of the structure shown in FIG. 4 as seen in the direction of arrow V, illustrating the heating system for the inserts;

FIG. 6 is a section taken on line VI—VI of FIG. 5, as seen in the direction of arrows;

FIG. 7 is a section at right angles to that of FIG. 2 with the ram in working position, showing a further modification of the distributor system; and FIG. 8 is a top plan view of a mold embodying a still further modification of the distributor.

Figure 1:
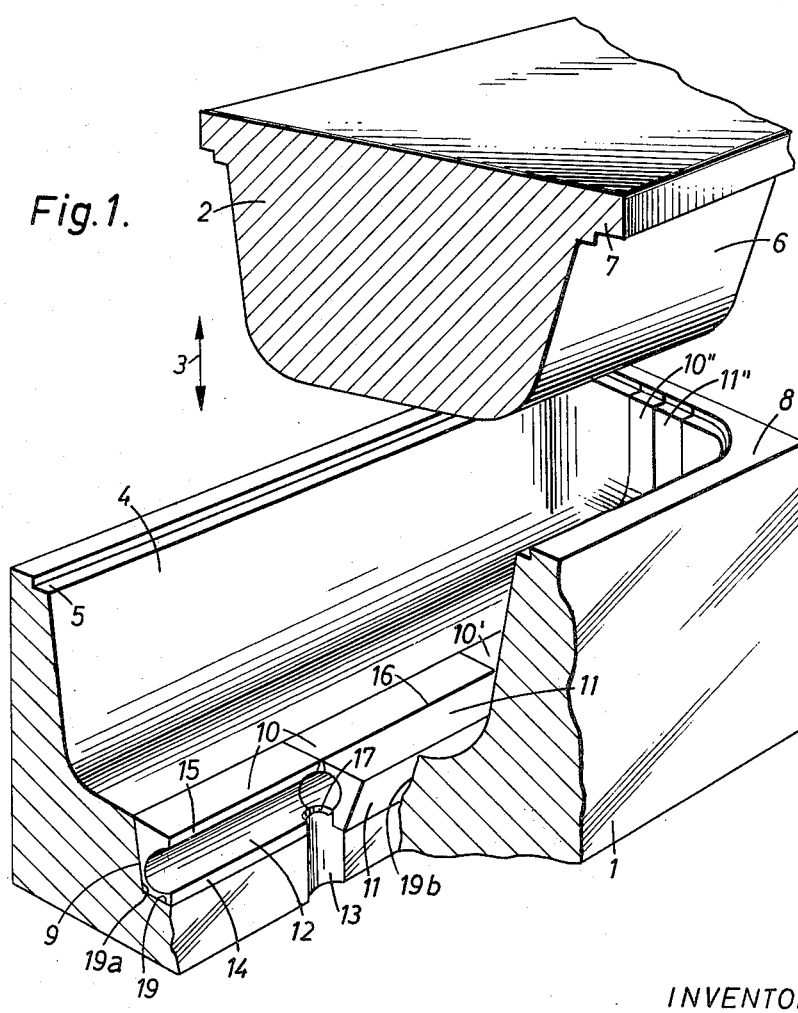
FIG. 1 shows in perspective view a stationary die or mold embodying certain component parts of the novel distributor means, and a ram therefor, a portion of the mold and of the ram being broken away for better illustration of the distributor means.

Referring first to FIG. 1, the part of injection molding machine therein shown comprises a stationary matrix or mold 1 and a ram 2. The ram may be reciprocated in the directions of double arrow 3 by means of a suitable mechanism of known construction (not shown).

The cavity in mold 1 is bounded by a moulding surface 4 which corresponds to outer contours of a large receptacle, for example, a bath tub. The upper edge of surface 4 is bounded by a continuous recess or notch 5 for reception of fluent plastic material which, when hardened, forms the flange of a bath tub. The molding surface 6 of ram 2 corresponds to the inner surface of the product and is bounded at its upper end by a flange 7 which abuts against the top surface 8 of female member 1 to tightly seal the mold space between surfaces 4 and 6 during the injection molding process. This space is filled with a fluent plastic material introduced therein by means of the improved distributor system.

A longitudinal groove 9 is cut into molding surface 4 of the mold 1, the groove being bounded by a surface 19 substantially parallel with the adjacent portion of molding surface 4 and by a pair of preferably inclined surfaces 19a, 19b which diverge outwardly toward the surface 4. The groove receives a series of inserts or blocks 10, 11; 10', 11' (the latter is shown in FIG. 2); and 10", 11", disposed in pairs, these inserts defining therebetween a continuous channel 12 of relatively large diameter which communicates with at least one supply line or passage 13 leading to the source of plasticized molding compound, for example, an extrusion press or the like. Passage or passages 13 extend through the base of mold 1, as is best shown in FIG. 2.

Inserts 10, 11 abut against each other along their surfaces 14, their surfaces 15 being spaced apart sufficiently to form therebetween a continuous slot or gap 16 (see FIG. 3) through which the fluent plastic material entering from passage 13 and filling the channel 12 may be injected into the mold space between surfaces 4, 6 of members 1, 2, respectively. The inserts are so compressed by the inclined walls adjacent to surface 19a, 19b that they prevent escape of plastic material between their surfaces 14. The retaining action of inclined walls surrounding the groove 9 may be amplified by suitable resilient means, as will be described hereinafter.

It will be noted in FIGS. 1 and 2 that the inserts 10, 11 are formed with suitable cutouts 17 permitting communication of channel 12 with the supply passage 13. These cutouts are preferably provided at the longitudinal ends of adjacent inserts though, if necessary, they may be provided at a point intermediate the ends of a pair of inserts. As further illustrated in FIGS. 1 and 2, the adjacent end surfaces between certain pairs of inserts or blocks are inclined so that the inserts retain each other by cam or wedge action in the groove 9. FIG. 2 also shows that the inserts 10', 11' adjacent to the arcuate zones of molding surface 4, and the inserts 10", 11" adjacent to the upper edge of said surface are of slightly modified shape, as well as that the channel 12 (shown in broken lines) expands slightly in inserts 10", 11" to insure ample supply of fluent plastic material to such zones of the mold space which are more remote from passage 13. In the just described embodiment, inclined end surfaces 18 are provided between adjacent pairs of inserts 10, 11 and 10', 11', respectively. The section of FIG. 2 is taken in front of inserts 11, 11" shown in FIG. 1, save for a short distance adjacent to passage 13 where the section line runs between the surfaces 14 of inserts 10, 11.

Figure 3:
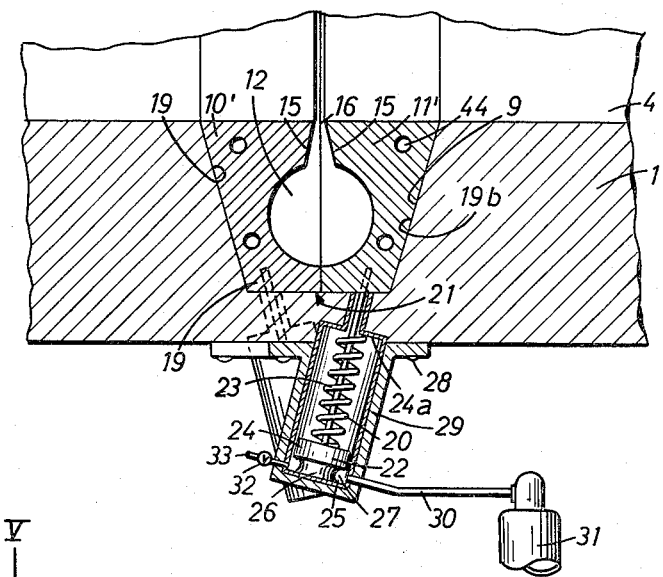
FIG. 3 is an enlarged transverse section taken on line III—III of FIG. 2 as seen in the direction of arrows, with the molded product removed.

As before mentioned, the retaining action of inclined walls in mold 1 surrounding the groove 9 may be supplemented by the action of a series of resilient elements, one of which is shown in greater detail in FIG. 3. A rod 23 has its upper end anchored, e.g. screwed, into the underside 21 of insert 11', its lower end being rigidly connected to a plunger 22 mounted in a cylinder 24. Coil spring 20 acts between plunger 22 and a shoulder 24a in the cylinder 24 and thus constantly urges the plunger together with rod 23 and insert 11' in downward direction whereby the underside of the insert abuts against the bottom surface 19 in groove 9. Cylinder 24 is installed in a tubular housing 29 which is fixed to the underside of mold 1 by a number of retaining screws 28.

Plunger 22 is formed with a reduced zone or extension 26 which normally abuts against the end plate 25 of cylinder 24 and defines therewith an annular space 27. A finished and hardened product, e.g. a bath tub 41 shown in FIG. 2, may be ejected from the mold by introducing into the space 27 of each cylinder 24 a fluid from lines 31 and 30, the fluid expanding about the reduced zone 26 and acting against the underside of plunger 22 to lift the plunger together with guide member 23 and insert 11', whereby the latter acts against the underside of molded product 41 and, together with other inserts, causes its ejection from the mold. Plunger 22 may be operated pneumatically or hydraulically; in FIG. 2, line 31 is shown connected to an air compressor 31a. The expulsion of an insert and upward movements of plunger 22 occur against the retaining force of spring 20, and the latter returns the insert 11' into the position of FIG. 3 when a safety valve 33 in line 32 is opened to permit escape of fluid medium from the cylinder. It will be noted in FIG. 3 that the inclination of a rod 23 preferably corresponds to or approximates the inclination of surface 19a or 19b in groove 9 whereby the inserts 10', 11', when lifted from the groove upon introduction of a fluid into their cylinders 24, are sufficiently spaced from each other to permit withdrawal of hardened plastic material, also called coupon, from the channel 12. In other words, the stroke of plungers 22 is so selected that the plungers, in their uppermost position, increase the width of slot 16 beyond the diameter of channel 12. More than one plunger may be coupled with each insert, depending on the size of inserts, their number in a groove 9, and the overall dimensions of the molded product.

It can further be observed in FIGS. 2, 2a, 3, 4 and 7 that the cylinders of pairwise disposed inserts 10, 11 and others are not aligned but are spaced from each other, which is due to their inclination from vertical.

Referring again to FIG. 2, line 13 is connected to a supply conduit 35 by means of a cap screw 34, the conduit 35 leading to a worm press 36. The latter is driven by an electric motor 38 over a belt drive 37 and is fed through a hopper 39. The synthetic material introduced into press 36 is heated therein by a coil 40 of known construction, and is conveyed in fluent state through lines 35, 13 and connecting passage or passages 17 into the channel 12, and thence through gaps or slots 16 into the mold space between surfaces 4 and 6. It is assumed here that the ram 2 is in its lowermost position (see FIG. 7) in which its flange 7 rests on the surface 8 of female member 1 and thus tightly seals the mold cavity. When the receptacle 41 is sufficiently cooled, a fluid is introduced under sufficient pressure into each cylinder 24 to lift the inserts in the hereinbefore described manner. During the ejection cycle, valves 33 remain closed so that the upwardly traveling plungers perform their ejection stroke by compressing springs 20 and separating the respective pairs of inserts from each other to an extent sufficient to permit removal of hardened plastic coupons from the channel 12.

As shown in FIG. 2a, inserts 10", 11" adjacent to the upper edge of molding surface 4 in female die 1 are combined with cylinders 24 and plungers 22 in identical manner, these plungers acting in a vertical plane but being inclined with respect to each other to permit separation of insert 10" from the adjacent member 11".

When the ejection of a finished product is completed, valves 33 are opened to permit escape of fluid from the underside of each plunger 22, whereupon springs 20 immediately return the inserts into their positions shown in the drawings.

In the somewhat modified structure shown in FIG. 4, end faces 118a of blocks 110, 111 which form the channel 112 are not inclined, the retaining action being furnished by the "corner" inserts 110', 111' disposed between members 110, 111 and 110", 111". It will be noted that, in contrast to the "corner" blocks or inserts 10', 11' shown in FIG. 2, members 110', 111' are formed with surfaces 142 which define therebetween a sharp edge 142a, and that the groove 109 in mold 101 is also modified accordingly. FIG. 4 further illustrates that the continuous slots between adjacent inserts may be replaced by a series of spaced orifices 143 which permit entry of fluent plastic material from channel 112 into the cavity in female member 101 to form a plastic receptacle 141. The arrangement of cylinders and pistons forming part of the ejecting and retracting mechanism is identical with that above described in connection with FIGS. 2, 2a and 3.

FIGS. 5 and 6 illustrate a heating system installed in the channel-forming inserts to insure that the plastic material in the channel remain in fluent state for a longer period of time. Inserts 110" and 111" are provided with heating channels or pipes 144 which communicate with a supply conduit 145 provided in the female member 101. Conduit 145 is connected to a line 146 which leads to a source of heated air or a heated liquid medium. It will be understood that, instead of heating an aeriform or liquid medium, suitable heating coils may be introduced into pipes 144 in each insert of the improved apparatus, or at least in the inserts more distant from the supply passage or passages 13. Channels 44 in blocks 10, 11 of FIG. 3 correspond to pipes 144 shown in FIGS. 5 and 6.

In the embodiments hereinbefore described, molds 1, 101 are formed with a single groove 9, 109, respectively. If the molded product is rather bulky, i.e. if the molding cavity in the female die is of substantial dimensions, it may be advantageous to employ a system as shown in FIGS. 7 and 8. In FIG. 7, mold 201 is formed with a pair of parallel grooves 209 each receiving a series of pairwise arranged inserts 210, 211 defining therewithin channels 212. The relatively large bath tub 241 or other type of bulky product may be ejected by a cylinder and plunger system 22, 24 connected with inserts 210, 211 in a manner identical with that described in connection with FIG. 3.

In FIG. 8, mold 301 is formed with a pair of intersecting grooves 309 in its molding surface 304. Inserts 310, 311 are so disposed that the slots 316 defined therebetween diverge from the center toward the edge of surface 304 to overcome the resistance to flow of the fluent plastic material injected therethrough into the mold space. By so forming the slots, equal quantities of plastic material are introduced into all zones of the mold space. Aside from slight modifications in the shape of inserts adjacent to the crossing of grooves 309, the embodiment of FIG. 8 is constructed and operates in the manner as hereinbefore described.

It will be obvious that various changes may be made by those skilled in the art in the details of apparatus described above within the spirit and scope of the invention as defined in the appended claims.

What I claim is:

1. A mold arrangement for injection molding a container having a wall of a thickness which is a small fraction of the major dimensions of height, width and length of the cavity defined by the container wall, comprising two mold portions releasably assembled and having respective opposite mold faces jointly defining a mold space substantially conforming to said wall, one of said portions being formed with an elongated groove having an open longitudinal side extending in the mold face thereof over a distance corresponding to more than one of said major dimensions, and said one mold portion being formed with an opening therethrough communicating with said groove, and a plurality of duct forming members releasably arranged in said groove and substantially filling the same, said members jointly defining a substantially closed elongated duct communicating with said opening, said duct extending over substantially said distance and having outlet means communicating with said mold space at a plurality of locations spaced along said distance.

2. A mold arrangement for injection molding a container having a wall of a thickness which is a small fraction of the major dimensions of height, width and length of the cavity defined by the container wall, said wall having a plurality of integral portions angularly offset relative to each other in the direction of said major dimensions, comprising two mold portions releasably assembled, and having respective opposite mold faces jointly defining a mold space substantially conforming to said wall, one of said mold portions being formed with an elongated groove having an open longitudinal side extending in a portion of said mold face corresponding to at least two of said angularly offset wall portions, and said one mold portion being formed with an opening therethrough communicating with said groove; and a plurality of duct forming members releasably arranged in said groove and substantially filling the same, said members jointly defining a substantially closed elongated duct communicating with said opening and having at least two angularly offset portions, said duct extending substantially over the length of said groove and having outlet means communicating with said mold space at a plurality of locations spaced along said length.

3. A mold arrangement as set forth in claim 2, wherein said duct forming members jointly constitute a longitudinally split tube formed with a longitudinal slot, said slot constituting said outlet means.

4. A mold arrangement as set forth in claim 2, wherein said groove tapers inward of said one mold portion in a direction away from said open side of said groove.

5. A mold arrangement as set forth in claim 2, further comprising fastening means on the other one of said mold portions for securing said duct forming members in said groove when said mold portions are assembled.

6. A mold arrangement as set forth in claim 2, further comprising heating means for heating at least one of said duct forming members.

References Cited in the file of this patent

UNITED STATES PATENTS

| | | |
|---|---|---|
| 1,349,122 | Edlund | Aug. 10, 1920 |
| 1,552,444 | Munro et al. | Sept. 8, 1925 |
| 1,554,200 | Coates | Sept. 22, 1925 |
| 1,630,262 | Fraser | May 31, 1927 |
| 2,182,402 | Lester | Dec. 5, 1939 |
| 2,476,884 | Maynard | July 19, 1949 |
| 2,510,716 | Portmann et al. | June 6, 1950 |
| 2,529,091 | Lester | Nov. 7, 1950 |
| 2,568,771 | Smith | Sept. 25, 1951 |
| 2,667,662 | Carlton | Feb. 2, 1954 |
| 2,724,865 | Mills et al. | Nov. 29, 1955 |